United States Patent
Sethi et al.

(10) Patent No.: US 12,158,830 B2
(45) Date of Patent: Dec. 3, 2024

(54) METHOD TO IDENTIFY THE PERFORMANCE BOTTLE NECK IN THE COMPLEX ENTERPRISE VIRTUALIZED ENVIRONMENT

(71) Applicant: EMC IP Holding Company LLC, Hopkinton, MA (US)

(72) Inventors: Parminder Singh Sethi, Punjab (IN); Bing Liu, Tianjin (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 183 days.

(21) Appl. No.: 17/223,604

(22) Filed: Apr. 6, 2021

(65) Prior Publication Data

US 2022/0318117 A1    Oct. 6, 2022

(51) Int. Cl.
G06F 11/00      (2006.01)
G06F 9/455      (2018.01)
G06F 11/30      (2006.01)
G06F 11/34      (2006.01)

(52) U.S. Cl.
CPC ...... *G06F 11/3409* (2013.01); *G06F 9/45558* (2013.01); *G06F 11/301* (2013.01); *G06F 11/3466* (2013.01); G06F 2009/45591 (2013.01)

(58) Field of Classification Search
CPC .............. G06F 11/0757; G06F 11/301; G06F 11/3409; G06F 11/3466; G06F 9/45558
See application file for complete search history.

(56) References Cited

U.S. PATENT DOCUMENTS

| | | | | |
|---|---|---|---|---|
| 8,230,107 | B2* | 7/2012 | Tantawi | G06F 9/505 |
| | | | | 718/105 |
| 9,122,505 | B1* | 9/2015 | Lunev | G06F 9/45545 |
| 9,372,775 | B1* | 6/2016 | Lam | G06F 11/3409 |
| 9,866,481 | B2* | 1/2018 | Agarwala | H04L 43/0882 |
| 10,817,606 | B1* | 10/2020 | Vincent | G06F 9/45558 |
| 2009/0300173 | A1* | 12/2009 | Bakman | G06F 11/3452 |
| | | | | 718/1 |
| 2010/0268816 | A1* | 10/2010 | Tarui | G06F 11/3409 |
| | | | | 718/1 |
| 2015/0007173 | A1* | 1/2015 | Ionescu | G06F 9/45533 |
| | | | | 718/1 |
| 2015/0007177 | A1* | 1/2015 | Tobo | G06F 9/45533 |
| | | | | 718/1 |
| 2015/0095485 | A1* | 4/2015 | Alatorre | H04L 47/125 |
| | | | | 709/224 |
| 2016/0057041 | A1* | 2/2016 | Gupta | H04L 41/16 |
| | | | | 709/224 |
| 2017/0364811 | A1* | 12/2017 | Malecki | G06F 9/505 |
| 2018/0150313 | A1* | 5/2018 | Iwakura | G06F 12/0831 |
| 2019/0243673 | A1* | 8/2019 | Franciosi | G06N 20/00 |
| 2020/0089536 | A1* | 3/2020 | Sumangala | G06F 3/0662 |
| 2020/0174842 | A1* | 6/2020 | Wang | H04L 67/63 |

* cited by examiner

*Primary Examiner* — Elmira Mehrmanesh
(74) *Attorney, Agent, or Firm* — Workman Nydegger

(57) ABSTRACT

One example method includes identifying a source of a performance issue in a virtualized environment. Telemetry data is collected relative to the flow of a request/response in the virtualized environment. The collected telemetry data can be compared to normal data. A probability can be generated for each layer to identify which of the layers is the most likely source of the performance issue. The layers can be prioritized based on their probability. The most likely layer or virtual machine is recommended for analysis to determine the cause of the performance issue.

14 Claims, 7 Drawing Sheets

METHOD TO IDENTIFY THE PERFORMANCE BOTTLE NECK IN THE COMPLEX ENTERPRISE VIRTUALIZED ENVIRONMENT

FIELD OF THE INVENTION

Embodiments of the present invention generally relate to performance operations and performance related operations in computing environments including virtualized computing environments. More particularly, at least some embodiments of the invention relate to systems, hardware, software, computer-readable media, and methods for identifying performance issues such as bottlenecks in virtualized computing environments.

BACKGROUND

Computing systems can be complex to build and maintain. Some computing systems, such as virtual computing systems, operate on the same underlying hardware. When an issue such as a performance issue arises in a virtualized system, it is difficult to identify the problem. For example, a virtual machine may not be working properly or is not performing as expected. Identifying the problem is time consuming at least because the virtual machine experiencing the performance issue may not be the problem. Further, the data flow in a virtual machine includes multiple plays from the application to the hardware. This further complicates the problem of identifying the cause of a performance issue.

More specifically, a customer may report that a specific virtual machine or that a virtualized environment has performance issues. Conventionally, an analysis may start by analyzing a specific virtual machine. While this is not necessarily a poor choice, it may not be the optimal choice at least because an issue may exist in any of the layers of the virtual machine and/or in a sibling virtual machine.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to virtual machine management and performance operations. More particularly, at least some embodiments of the invention relate to systems, hardware, software, computer-readable media, and methods for identifying performance issues in a virtualized computing environment.

Embodiments of the invention can collect telemetry data such as operational data in virtual machines that can be used to identify which virtual machines and/or which layers of the virtual machines are causing performance issues in the virtualized environment. Embodiments of the invention can collect operational data such as request-response time or the like. The request or response times may relate to time required for a request response to flow from one layer to the next in the virtualized environment. The operational or telemetry data can be analyzed to identify patterns or to identify deviations from expected or default operational data. These deviations may identify the likely source or cause of performance issues. More specifically, embodiments of the invention allow a specific virtual machine or a specific layer of a virtual machine to be examined first. This optimizes the process of determining the root cause of a performance issue and leads to improved customer satisfaction and improved performance.

Figure 1:
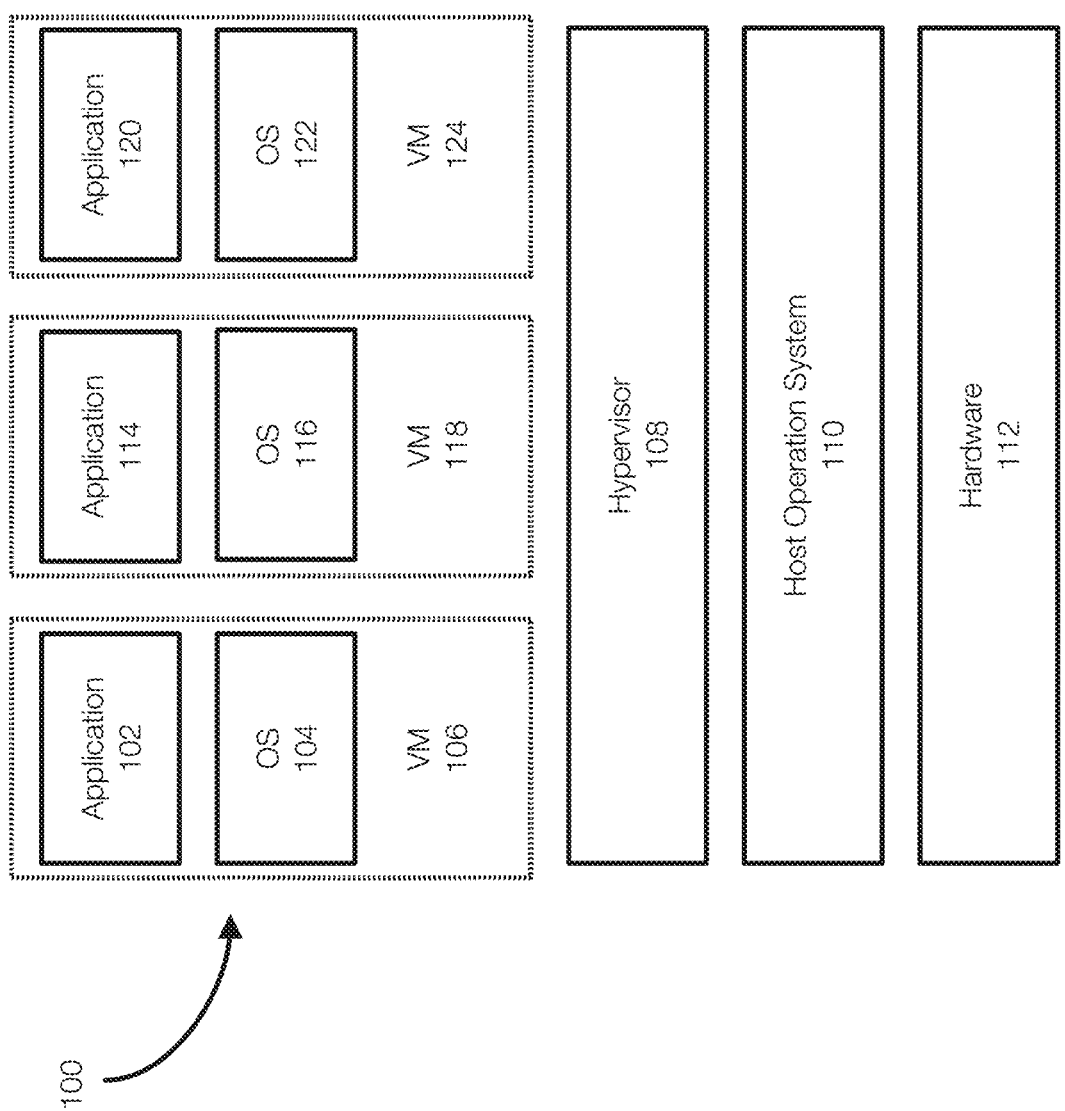
FIG. 1 discloses aspects of a virtualized environment including virtual machines.

FIG. 1 illustrates, by way of example only and not limitation, a virtualized computing environment. The virtualized computing environment 100 illustrates virtual machines (VMs) 106, 118, and 124, which may be representative of a plurality of virtual machines (e.g., 10 or more, 100 or more, 1000 or more or the like). The virtual machines 106, 118 and 124 may also be a layer in the virtualized environment 100.

The virtual machine 106 may be associated with a guest operating system (OS) 104 and an application 102 (representative of potentially multiple applications. The virtual machines 118 and 124 similarly include OS 116, 122 and applications 114, 120.

The virtual machines 106, 118, and 124 operate on a virtualization layer such as a hypervisor 108, which operates on a host operating system 110 or a physical machine in one example. The physical machine includes hardware 112 (e.g., storage, memory, processors) that is virtualized and allocated to the virtual machines 106, 118, and 124.

Virtual environments may have different forms or configurations. For example, hypervisors may be implemented as type-1 (bare-metal hypervisors) or type-2 (hosted) hypervisors. Embodiments of the invention can operate in different virtual machine or hypervisor configurations.

Figure 2:
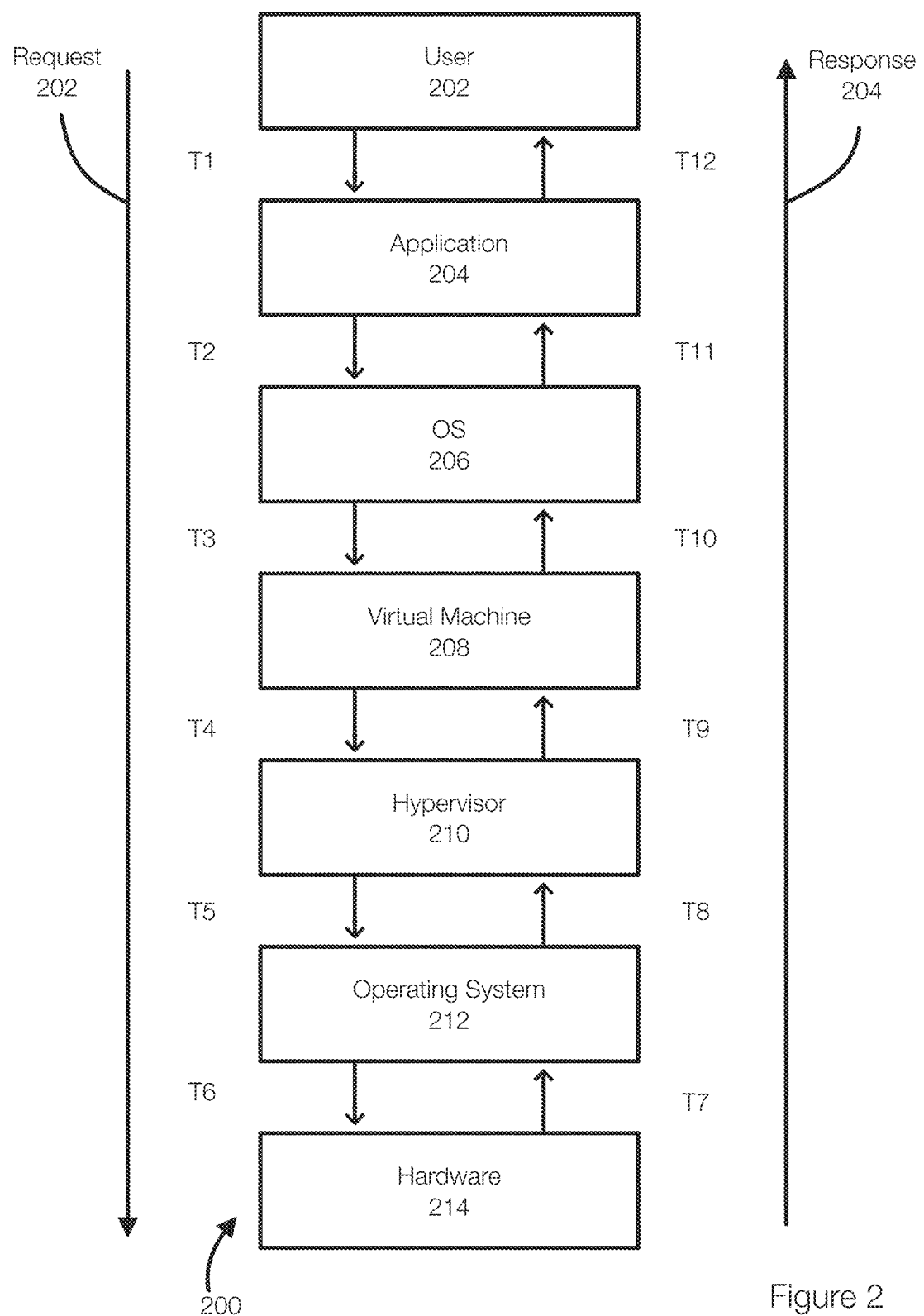
FIG. 2 discloses aspects of a request/response in a virtual machines and discloses aspects request/response times for the request/response.

FIG. 2 illustrates an example of a virtual machine that may operate in a virtualized environment. FIG. 2 illustrates a virtual machine 208 (which may include layers including an application 204 layer, an OS 206 layer and a virtual machine 208 layer) operating in a virtualized environment 200. FIG. 2 illustrates a flow path in the environment 200 that includes a request 202 and a response 204. In one example, the request 202 and the response 204 are part of the same action (e.g., read a file, write to a file, etc.). The request 202 is typically the portion directed towards the hardware 214 and the response is typically directed towards the application 204 or user 202.

For example, a user 202 may be using a word processing application as the application 204, when the user 202 selects a file to access (e.g., open, read, write, save), the user may perform an action such as a mouse click or pressing an enter key. There is a time T1 associated with the request as the request proceeds from the action of the user 202 to the application 204. For this request or input, there is a time T2 from the application 204 to the OS 206, a time T3 from the OS 206 to the virtual machine 208, a time T4 from the virtual machine 208 to the hypervisor 210, a time T5 from the hypervisor 210 to the operating system 212, and a time T6 from the operating system 212 to the hardware 214. These times T1-T6 can be associated with the request 202.

The response 204 is similar and includes times T7, T8, T9, T10, T11, and T12 as the response 204 proceeds from the hardware 214 layer back to the user 202. Thus, the times associated with the request 202 and the response 204 are examples of telemetry data that may be collected from the virtual machines for identifying performance issues or for troubleshooting performance issues such as performance bottlenecks in a virtualized environment.

Figure 3:
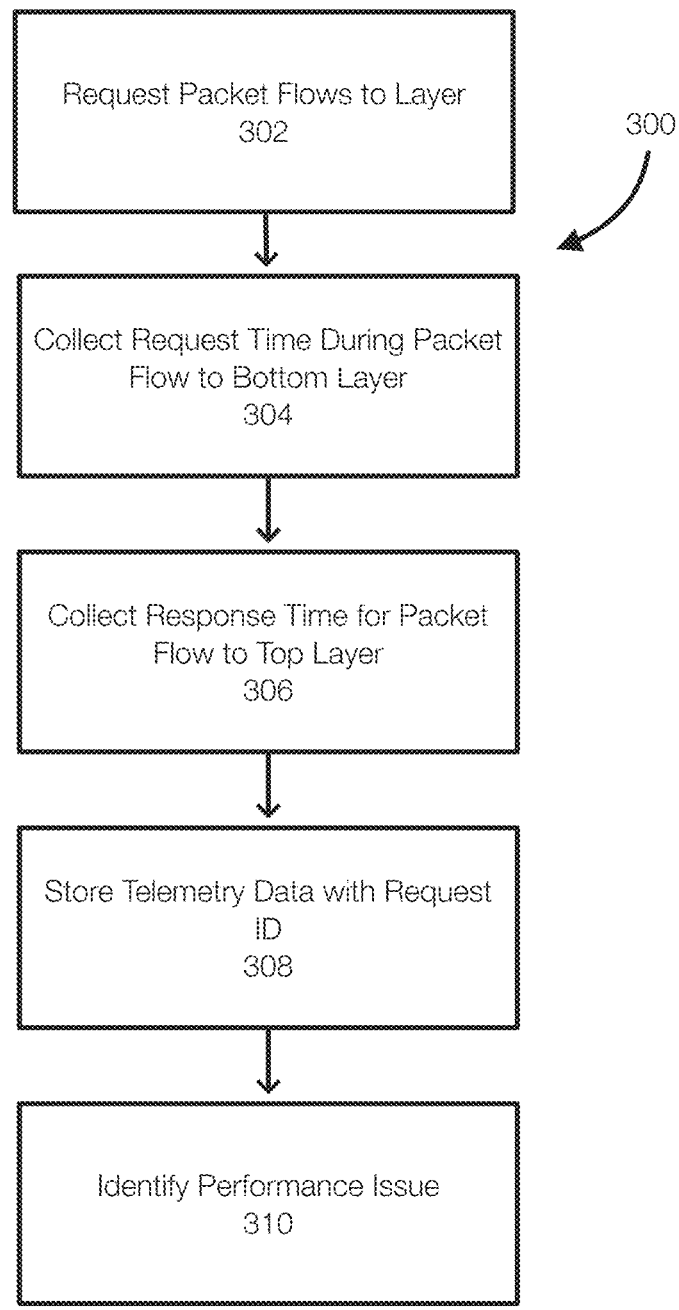
FIG. 3 discloses aspects of a method for identifying a performance issue in a virtualized environment.

FIG. 3 discloses aspects of collecting telemetry data in a virtualized environment. The method 300 may begin when a request is triggered 302. When a request is triggered (e.g., by a user action or by other action that may be machine initiated), a request packet begins to flow to the bottom layer. As the request packet flows to the bottom layer, the response times (e.g., T1-T6) are collected 304 at each layer and added to the request packet.

The collected data in the request packet may be added to a response packet that flows from the bottom layer to the top layer. The response times (e.g., T7-T12) are in the response data flow are collected and added to the response packet. The telemetry data (response times T1-T12) may be stored 308 in a database along with a request identifier. Finally, the telemetry data from the request/response may be used to identify 310 a performance issue. The telemetry data analyzed may include telemetry data collected from the machine over time from multiple response/request packets.

Figure 4:
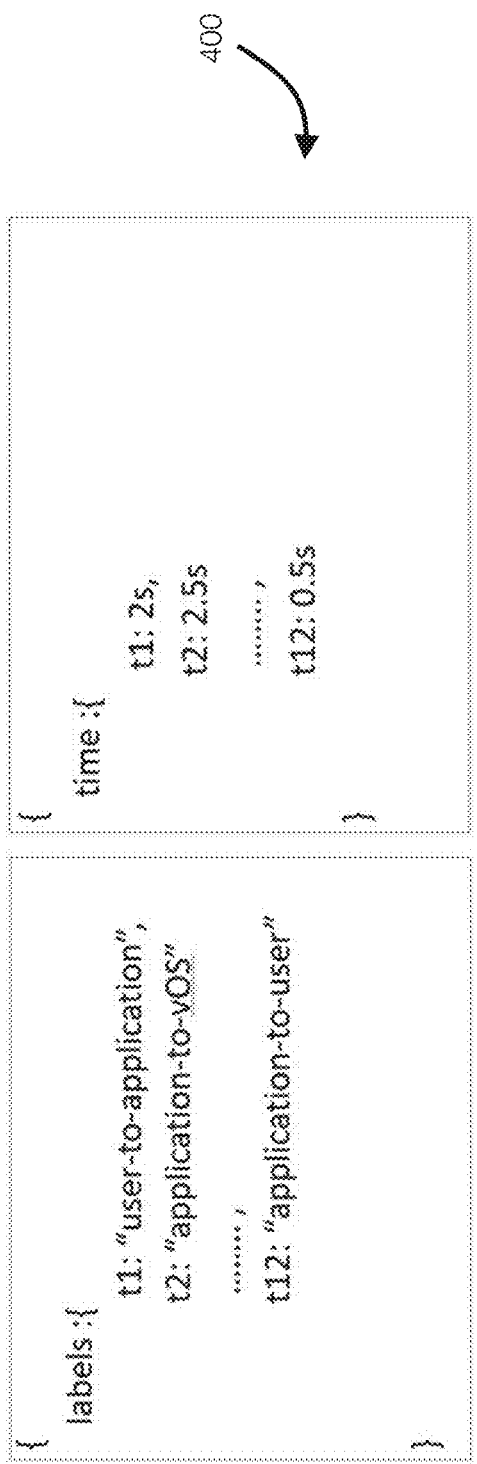
FIG. 4 discloses aspects of telemetry data associated with a response/request.

FIG. 4 illustrates an example of telemetry data 400 that may be added to a response packet. In this example, the telemetry data 400 may associated labels to times. As illustrated, T1 (e.g., 2 s) corresponds to the time from the user layer or from the user action to the application layer. The other times are similarly determined and included in the telemetry data 400. In a database, the labels map T1 to what it represents. For example, T1 is mapped to the time from the user layer to the application layer. The time values are stores for each mapping.

Figure 5:
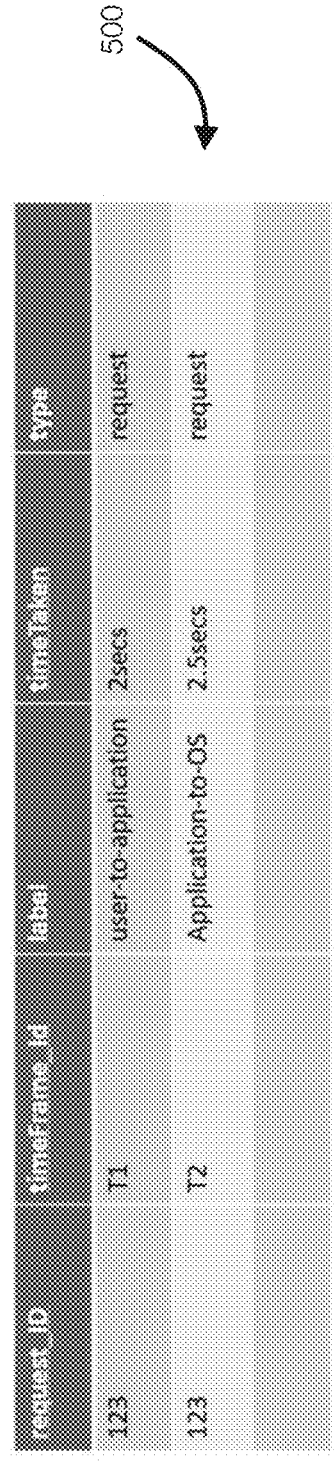
FIG. 5 discloses aspects of telemetry data stored in a database.

FIG. 5 discloses aspects of a database. The database 500 may store data collected from a request/response packet. In this example, the database 500 may associate a request identifier (ID) with a timeframe ID, a label, a time taken and a type. This allows each of the times (T1-T12 in this example) to be stored separately.

In one example, all of the telemetry data for a specific user (or specific machine) can be collected. Over time, this data may be used to identify or determine an expected or default time for each of T1-T12. These expected or default values may change over time. Further, the expected or default time may be viewed as a threshold. Times over the threshold may suggest a performance issue.

The telemetry data can be collected on the fly or as a request flows through the layers of the virtualized environment. In one example, although not precluded, there may be no need to collect information related to the user, the application, memory, disk usage, processor, network, or the like. Rather, embodiments of the invention can identify performance issues based on a single parameter—the request/response times T1-T12. The amount of telemetry data collected for a given request may depend on how many layers are needed to fulfill a request. For example, a request to determine how much disk space remains will traverse all of the layers while another request may not.

Figure 6:
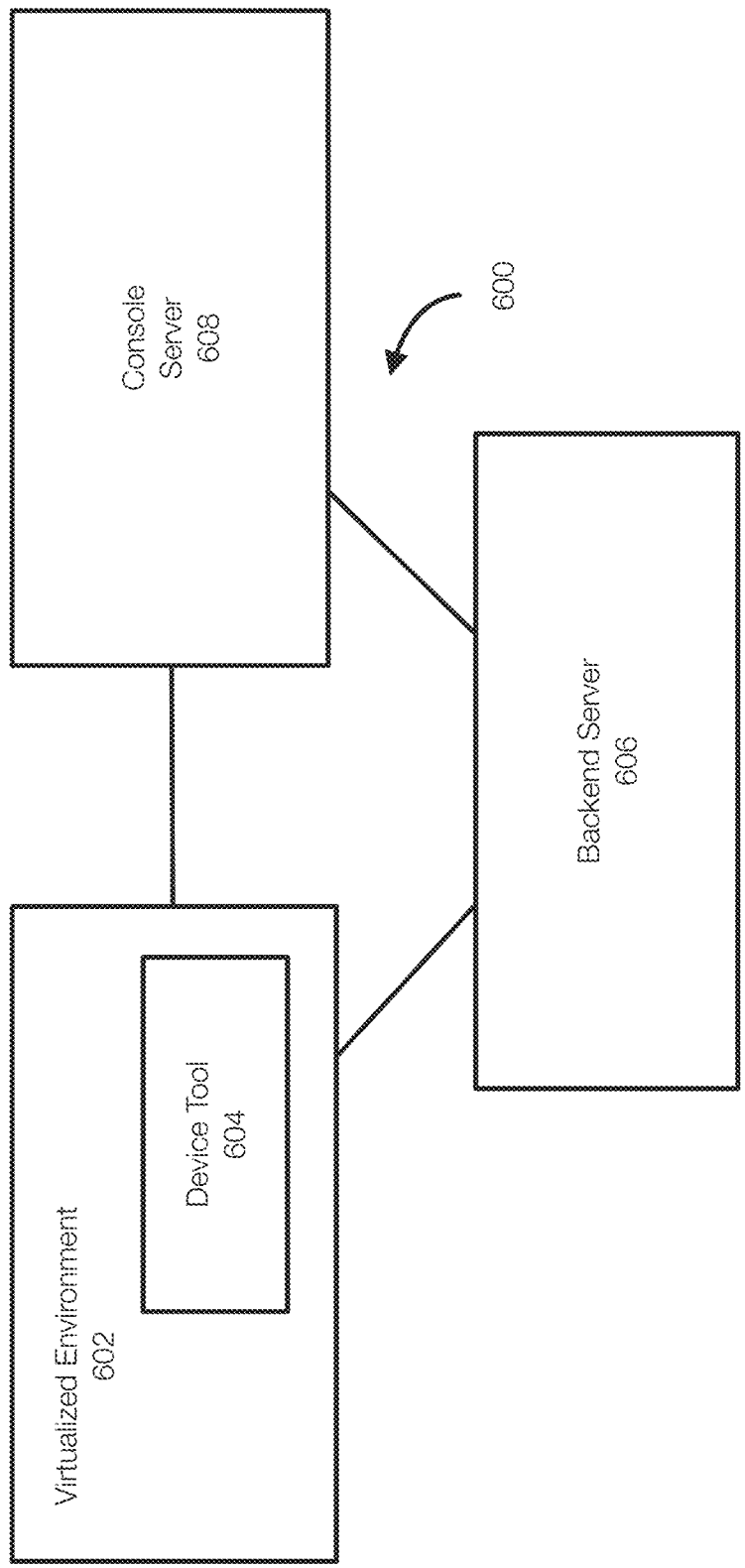
FIG. 6 discloses aspects of a distributed system for identifying potential performance issues in a virtualized computing environment.

FIG. 6 discloses aspects of a system configured to identify performance issues. In one example, the system 600 relies on telemetry data that is collected over type. The telemetry data can be collected manually or on-command, periodically, or in a triggered manner. For example, whenever a virtual machine or system is not performing as expected, an alert will be generated and the alert may trigger the collection of telemetry data.

In one example, a system 600 may include a device tool 604 that operates in the virtualized environment. Each virtual machine or each physical server hosting multiple machines may be associated with a device tool 604. The device tool 604 may be configured to collect the telemetry data and may be configured to provide other support and service related operations. The collection of telemetry data may be integrated with the process of collecting other device data. The ability to collect telemetry data related to detecting performance issues can be turned on or off. The collected data may be transmitted to the backend server 606.

The console server 608 may be associated, for example, with customer support or technical support that may be tasked to find the root cause of a customer's concern. By identifying a source of a performance issue, the console server 608 may then perform the task of identifying the cause of the performance issue starting in the identified location.

The server 606 may be configured to perform an analysis on the telemetry data received from the device tool 604. The backend server 606 may identify the machine, virtual machine, set of machines, layer or set of layers that appear to be the cause of the performance issue in the virtualized environment 602. This analysis can be performed on-demand. This analysis can also be used as a performance tool to optimize the performance of the virtualized environment. In other words, even if a performance issue is not detected, existing performance levels that may be improved based on the analysis.

The backend server 606 may inform the specific client machine and/or the console server 608 of the results of the performance analysis. This advantageously allows the console server 608 or the technical support to start the analysis with the troublesome layer rather than relying on the technical support team to identify where they think the problem exists. As a result, performance issues can be more quickly identified and remedied.

In one example, a server or virtual machine may be associated with default values for T1-T12 (or however many values are present based on the number of layers). These default values can be used by the device tool 604, the backend server 606 and the console server 608. In addition, these default values may be adjusted based on usage by a user. Thus, user-specific or machine specific values may also be available or may be generated over time. Default values may not work for all users or machines initially. However, these values are modified over time based on collected telemetry data and usage. As a result, the results and recommendations improve over time.

In one example, the collected telemetry data can be grouped in different ways such as by machine, by workload, by application, or the like. This allows expected or normal times to be generated based on workload pattern, machine configuration, or the like.

Initially, default values may be set in a machine such that alerts can be triggered if necessary when the performance exceeds the default thresholds. These values can be adapted over time based on the collection of telemetry data. The collected values include:

T user (current)={T1, T2, . . . , T11, T12}→User's Current Behavior

T Normal=User Specific Threshold Value.

These values thus represent the current values associated with current request/responses that are evaluated in the context of normal threshold values. For example, the normal threshold value for T1 may be 2 seconds. If the actual value of T1 is 3 seconds, an alert may be generated.

Once the normal or default values are established, the likelihood percentage or the probability that the issue is with the hardware layer can be determined as follows:

$$\frac{T\,User\,\{7\} - TNormal}{TUser\{7\}} * 100$$

In this example T User {x}: x=7: response time of hardware.

In this example, the hardware is the last or bottom layer of the virtualized environment. As a result, only a single factor is driving the probability of this layer. Other layers may have a two-way response (one on the request side and one on the response side).

To determine the probability of the issue being in some middle layer "A", the following values are considered.

The Net Average Response Time (NART) of layer A:

NART=(Response time of layer A to its lower layer)−(Response time of layer A to its upper layer)

The probability can be determined as follows:

$$\frac{TUser(NART\,of\,layer\,A) - TNormal(NART\,of\,layer\,A)}{TUser(NART\,of\,layer\,A)} * 100$$

In this example, TUser (NART of layer A) is the net average response time of layer for current user and the TNormal (NART of layer A) is the net average response time or layer threshold. This allows the measured or potentially problematic request/response times to be evaluated in the context of normal or expected request/response times.

For example, the probability of an issue being with the application layer is:

$$\frac{TUser(T2 + T11) - TNormal(T2 + T11)}{TUser(NT2 + T11)} * 100$$

These values or probabilities may be determined for each layer. The layer with the highest percentage is more likely to be the bottleneck or the source of the performance issue in the virtualized and distributed environment. The layer with the highest percentage is also the first layer recommended to the console server 608 for further analysis. There may be multiple bottlenecks and embodiments of the invention may prioritize the performance issues based on the associated percentages.

In one example, the collection of telemetry data may not happen continually. When a system is healthy and operating normally, the telemetry data may only be collected some of the time. This allows an average to be generated while avoiding too much overhead. If performance degradation is determined, the collection of telemetry data may be triggered. Even if overhead is large, collecting the telemetry data in response to a potential performance issued allows the likely source of the performance issue to be identified in a more rapid manner. In one example, when collecting telemetry data, the telemetry data is collected over time such that many samples are available for analysis.

Figure 7:
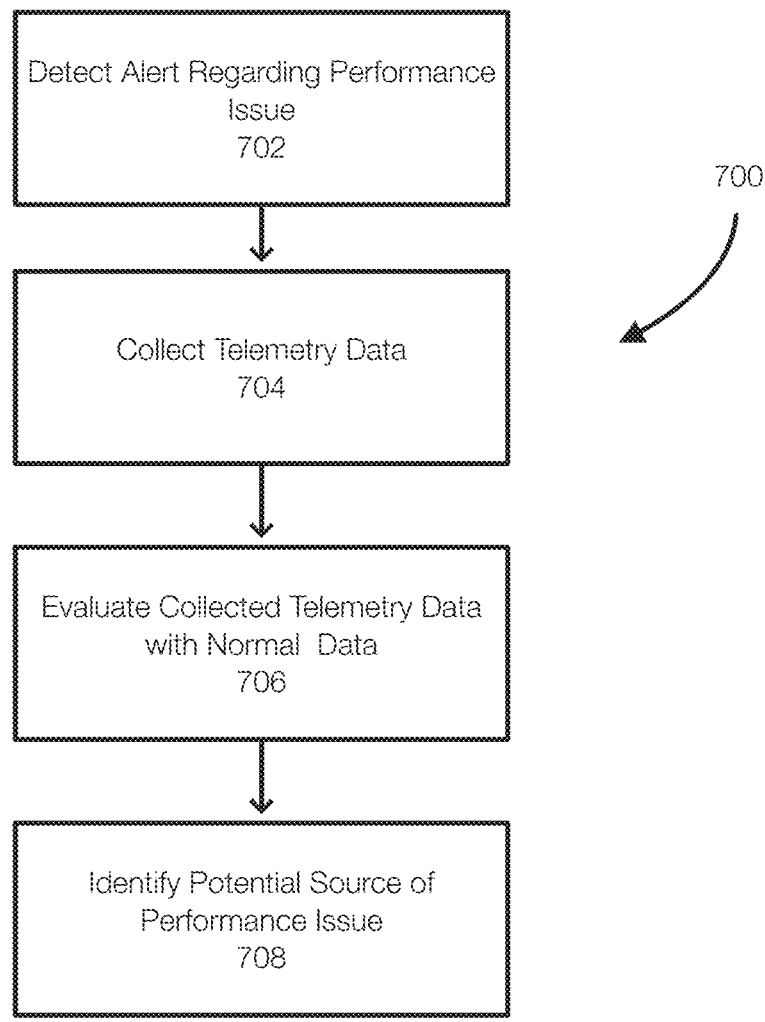
FIG. 7 discloses aspects of identifying a performance issue or a source of a performance issue in a virtualized environment.

FIG. 7 discloses aspects of a performance operation. FIG. 7 discloses aspects of a method 700 for identifying a performance issue. The method 700, for example, may identify a specific layer of a specific virtual machine as a source of a performance issue. The layer or virtual machine may be further analyzed to determine a cause of the performance issue. The method 700 may includes other elements as discussed herein.

Generally, the method may detect 702 an alert regarding performance issue. For example, a virtual machine or management console may note that a virtual machine is not performing as expected and generate an alert. Once the alert is detected or received, telemetry data is collected 704. The collection of telemetry data may be for a specific virtual machine or for multiple virtual machines.

Once sufficient telemetry data is collected (e.g., telemetry data may be collected for some period of time), the collected telemetry data is evaluated 706 in the context of normal or expected telemetry data. For example, a virtual machine may be associated with normal or expected times for T1-T12. These values may simply be set by default and may be adjusted over time based on telemetry data collected from the machine or from other similar machines. These expected times may act as threshold values.

The evaluation of the telemetry data may include generating a probability for each layer in the virtual machine. The layer with the highest probability is identified 708 as a potential source of a performance issue. The layers can thus be prioritized for further analysis. This helps ensure that the cause of a performance issue is discovered more quickly.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, performance operations. Such performance operations may include collecting telemetry data, determining an expected or normal request/response time for multiple layers of a virtual machine, determining probabilities for layers, prioritizing which layers are analyzed for performance issues, and the like or combination thereof.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM).

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs.

The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example. Embodiments of the invention may also be containerized.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Following are some further example embodiments of the invention. These are presented only by way of example and are not intended to limit the scope of the invention in any way.

Embodiment 1

A method, comprising: collecting telemetry data for a virtual machine, the telemetry data including request times and response times, evaluating the collected telemetry data with expected telemetry data, and identifying a potential source of a performance issue in the virtual machine based on the evaluation.

Embodiment 2

The method of embodiment 1, further comprising collecting the telemetry data in response to an alert indicating that the virtual machine or another virtual has the performance issue.

Embodiment 3

The method of embodiment 1 and/or 2, further comprising collecting the telemetry data for multiple virtual machines.

Embodiment 4

The method of embodiment 1, 2, and/or 3, wherein evaluating the collected telemetry data includes generating a probability for each layer of the virtual machine, wherein the probability represents a likelihood that the corresponding layer is the potential source of the performance issue.

Embodiment 5

The method of embodiment 1, 2, 3, and/or 4, further comprising prioritizing the layers for analysis at a console to determine a cause of the performance issue.

Embodiment 6

The method of embodiment 1, 2, 3, 4, and/or 5, further comprising setting the expected telemetry data to default values.

Embodiment 7

The method of embodiment 1, 2, 3, 4, 5, and/or 6, further comprising adjusting the expected telemetry data over time based on telemetry data collected when no performance issues are present.

Embodiment 8

The method of embodiment 1, 2, 3, 4, 5, 6, and/or 7, wherein the request times include times associated with the request as the request flows through the layers from a user layer to a hardware layer, wherein each of the times corresponds to a time for the request to flow from one layer to the next layer.

Embodiment 9

The method of embodiment 1, 2, 3, 4, 5, 6, 7, and/or 8, wherein the response times include times associated with a response as the response flows back from the hardware layer to the user layer, wherein each of the times corresponds to a time for the response to flow from one layer to the next layer.

Embodiment 10

The method of embodiment 1, 2, 3, 4, 5, 6, 7, 8, and/or 9, wherein the request times include a time T1 from a user layer to an application layer, a time T2 from the application layer to a first OS layer, a time T3 from the first OS layer to the virtual machine layer, a time T4 from the virtual machine layer to a hypervisor layer, a time T5 from the hypervisor layer to a second operating system layer, and a time T6 from the second operating system layer to a hardware layer and wherein the response times include a time T7 from the hardware layer to the second operating system layer, a time T8 from the second operating system layer to the hypervisor layer, a time T9 from the hypervisor layer to the virtual machine layer, a time T10 from the virtual machine layer to the first OS layer, a time T11 from the first OS layer to the application layer, and a time T12 from the application layer to the user layer.

Embodiment 11

A method for performing any of the operations, methods, or processes, or any portion of any of these, or any combination thereof disclosed herein.

Embodiment 12

A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 8:
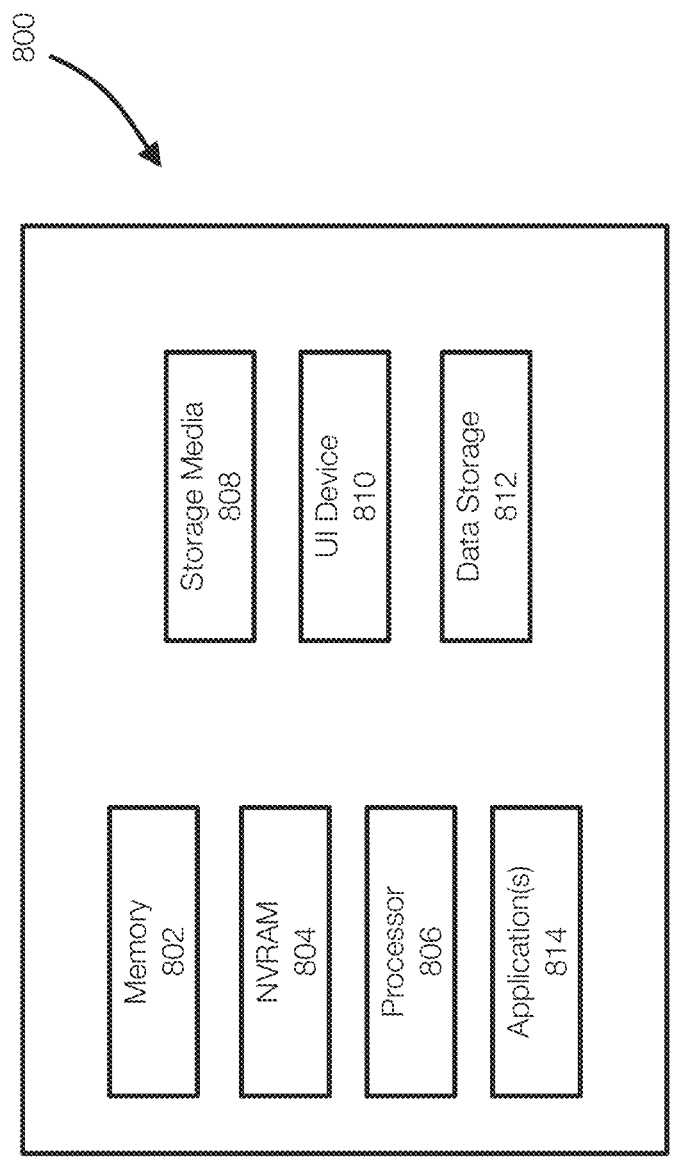
FIG. 8 discloses aspects of a computing device or system.

With reference briefly now to FIG. 8, any one or more of the entities disclosed, or implied, herein, may take the form of, or include, or be implemented on, or hosted by, a physical computing device, one example of which is denoted at 800. As well, where any of the aforementioned elements comprise or consist of a virtual machine (VM), that VM may constitute a virtualization of any combination of the physical components disclosed in FIG. 8.

In the example of FIG. 8, the physical computing device 800 includes a memory 802 which may include one, some, or all, of random access memory (RAM), non-volatile memory (NVM) 804 such as NVRAM for example, read-only memory (ROM), and persistent memory, one or more hardware processors 806, non-transitory storage media 808, UI device 810, and data storage 812. One or more of the memory components 802 of the physical computing device 800 may take the form of solid state device (SSD) storage. As well, one or more applications 814 may be provided that comprise instructions executable by one or more hardware processors 806 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    collecting telemetry data for a virtual machine, the telemetry data including request times and response times associated with a request flowing through layers of the virtual machine, wherein the request times include times associated with the request as the request flows through the layers of the virtual machine from a user layer to a hardware layer, wherein each of the times corresponds to a time for the request to flow from one layer to the next layer, wherein the response times include times associated with a response as the response flows back from the hardware layer to the user layer of the virtual machine, wherein each of the times corresponds to a time for the response to flow from one layer to the next layer;
    evaluating the collected telemetry data based on expected telemetry data, wherein the expected telemetry data includes expected request times and expected response times;
    generating a probability for each layer of the virtual machine, wherein the probability represents a likelihood that a corresponding layer is a potential source of a performance issue;
    identifying the potential source of the performance issue in the virtual machine based on the evaluation and the probability by troubleshooting the performance issue starting in the layer associated with a highest probability; and
    updating the expected telemetry data based on the collected telemetry data.

2. The method of claim 1, further comprising collecting the telemetry data in response to an alert indicating that the virtual machine or another virtual machine has the performance issue.

3. The method of claim 1, further comprising collecting the telemetry data for multiple virtual machines.

4. The method of claim 1, further comprising prioritizing the layers for analysis at a console to determine a cause of the performance issue.

5. The method of claim 4, further comprising setting the expected telemetry data to default values.

6. The method of claim 5, further comprising adjusting the expected telemetry data over time based on telemetry data collected when no performance issues are present.

7. The method of claim 1, wherein the request times include a time T1 from a user layer to an application layer, a time T2 from the application layer to a first OS layer, a time T3 from the first OS layer to the virtual machine layer, a time T4 from the virtual machine layer to a hypervisor layer, a time T5 from the hypervisor layer to a second operating system layer, and a time T6 from the second operating system layer to a hardware layer and wherein the response times include a time T7 from the hardware layer to the second operating system layer, a time T8 from the second operating system layer to the hypervisor layer, a time T9 from the hypervisor layer to the virtual machine layer, a time T10 from the virtual machine layer to the first OS layer, a time T1 from the first OS layer to the application layer, and a time T12 from the application layer to the user layer.

8. A non-transitory storage medium having stored therein instructions that are executable by one or more hardware processors to perform operations comprising:
    collecting telemetry data for a virtual machine, the telemetry data including request times and response times associated with a request flowing through layers of the virtual machine, wherein the request times include times associated with the request as the request flows through the layers of the virtual machine from a user layer to a hardware layer, wherein each of the times corresponds to a time for the request to flow from one layer to the next layer, wherein the response times include times associated with a response as the response flows back from the hardware layer to the user layer of the virtual machine, wherein each of the times corresponds to a time for the response to flow from one layer to the next layer;

evaluating the collected telemetry data based on expected telemetry data, wherein the expected telemetry data includes expected request times and expected response times;

generating a probability for each layer of the virtual machine, wherein the probability represents a likelihood that a corresponding layer is a potential source of a performance issue;

identifying the potential source of the performance issue in the virtual machine based on the evaluation and the probability by troubleshooting the performance issue starting in the layer associated with a highest probability; and updating the expected telemetry data based on the collected telemetry data.

9. The non-transitory storage medium of claim 8, further comprising collecting the telemetry data in response to an alert indicating that the virtual machine or another virtual machine has the performance issue.

10. The non-transitory storage medium of claim 8, further comprising collecting the telemetry data for multiple virtual machines.

11. The non-transitory storage medium of claim 8, further comprising prioritizing the layers for analysis at a console to determine a cause of the performance issue.

12. The non-transitory storage medium of claim 11, further comprising setting the expected telemetry data to default values.

13. The non-transitory storage medium of claim 12, further comprising adjusting the expected telemetry data over time based on telemetry data collected when no performance issues are present.

14. The non-transitory storage medium of claim 8, wherein the request times include a time T1 from a user layer to an application layer, a time T2 from the application layer to a first OS layer, a time T3 from the first OS layer to the virtual machine layer, a time T4 from the virtual machine layer to a hypervisor layer, a time T5 from the hypervisor layer to a second operating system layer, and a time T6 from the second operating system layer to a hardware layer and wherein a the response times include a time T7 from the hardware layer to the second operating system layer, a time T8 from the second operating system layer to the hypervisor layer, a time T9 from the hypervisor layer to the virtual machine layer, a time T10 from the virtual machine layer to the first OS layer, a time T11 from the first OS layer to the application layer, and a time T12 from the application layer to the user layer.

* * * * *